United States Patent [19]

Werner et al.

[11] Patent Number: 5,030,416

[45] Date of Patent: Apr. 30, 1991

[54] CATHODE FOIL FOR ELECTROLYTIC CAPACITORS

[75] Inventors: Martin Werner, Singen, Fed. Rep. of Germany; Margarete Bloeck; Heinz Bichsel, both of Neuhausen am Rheinfall, Switzerland

[73] Assignees: Swiss Aluminium Ltd., Chippis, Switzerland; Swiss Aluminium Ltd., Chippis, Switzerland

[21] Appl. No.: 409,161

[22] Filed: Sep. 19, 1989

[30] Foreign Application Priority Data

Sep. 27, 1988 [CH] Switzerland .......................... 3591/88

[51] Int. Cl.$^5$ ............................................... C22C 21/00
[52] U.S. Cl. ..................................... 420/538; 148/437; 148/438; 420/537; 420/548; 420/550; 428/606
[58] Field of Search ............... 420/538, 537, 548, 550; 148/437, 438; 428/606

[56] References Cited

U.S. PATENT DOCUMENTS

| 4,737,198 | 4/1988 | Shabel et al. ........................... 148/2 |
| 4,800,133 | 1/1989 | Arai et al. ........................... 428/606 |
| 4,824,494 | 4/1989 | Shozo Umetsu et al. .......... 148/438 |

FOREIGN PATENT DOCUMENTS

| 0024369 | 3/1981 | European Pat. Off. . |
| 1534797 | 8/1968 | France . |
| 2091651 | 1/1972 | France . |
| 2508697 | 12/1982 | France . |
| 1-66687 | 3/1989 | Japan . |

Primary Examiner—David W. Schumaker
Attorney, Agent, or Firm—Bachman & LaPointe; Bachman & LaPointe

[57] ABSTRACT

An aluminum alloy that is suitable as material for cathode foils in electrolytic capacitors comprises 0.9 to 1.7% iron
0.1 to 0.8% manganese
max. 0.15% silicon
max. 0.3% copper, the remainder being aluminum with further trace elements, individually <0.05%, in total <0.15%, and the total iron and manganese content amounting to at most 1.9%.

7 Claims, No Drawings

CATHODE FOIL FOR ELECTROLYTIC CAPACITORS

BACKGROUND OF THE INVENTION

The invention relates to the use of an aluminum alloy as material for cathode foils in electrolytic capacitors.

Cathode foils in electrolytic capacitors are today mainly made of pure aluminum or aluminum-manganese alloys. It is also known that, in the case of cathode foils of Al-Mn alloys, an addition of copper increases the capacitance values achieved after etching. The addition of copper does, however, have a disadvantage with respect to the long term behavior of the capacitor as the copper oxide formed on etching dissolves in time in the electrolyte of the capacitor and precipitates again as metallic copper on certain parts of the capacitor. The said precipitated crystals of copper can lead to electrical discharges in the capacitor, which is thus prematurely rendered unusable.

SUMMARY OF THE INVENTION

In view of the above the object of the invention is to provide a material, for cathode foils in electrolytic capacitors, in the form of a suitable alloy which, also without the addition of copper, leads to good capacitance values after etching.

The object of the invention is achieved by using as the material for cathode foils in electrolytic capacitors and aluminum alloy containing 0.9 to 1.7% iron
0.1 to 0.8% manganese
max. 0.15% silicon
max. 0.3% copper, the remainder being aluminum with further trace elements individually <0.05%, in total <0.15%, and the total iron and manganese content amounting to at most 1.9%.

All concentrations refer to weight percent.

DETAILED DESCRIPTION

The concentration ranges for the main elements are preferably 1.0 to 1.5% iron and
0.1 to 0.5% manganese.

The low copper alloy contains at most 0.1% copper, preferably at most 0.05% copper.

The copper rich alloy is characterized by way of a copper content of 0.1 to 0.3%.

Extensive investigations on etched foil samples of the alloy according to the invention revealed that the low copper versions exhibit higher capacitance values than the known low copper alloys. The copper rich versions lead to even higher capacitance values.

The advantage of the alloys according to the invention is to be seen from the following consideration of exemplified embodiments.

Four different alloys were continuously d.c. cast and processed to this strip 55μm thick by hot and cold rolling. These foils were etched using a standard process. The capacitance values achieved are presented in the following table.

| Alloy | Si | Fe | Cu | Mn | Ti | Capacitance $\mu F/cm^2$ |
|---|---|---|---|---|---|---|
| A | 0.11 | 0.55 | <0.005 | 1.05 | 0.006 | 150-200 |
| B | 0.13 | 0.62 | 0.15 | 0.97 | 0.010 | 320-340 |
| C | 0.10 | 1.02 | <0.005 | 0.82 | 0.007 | 320-350 |
| D | 0.11 | 1.49 | <0.005 | 0.21 | 0.005 | 350-370 |

Concentrations in wt %
A,B: alloys for comparison purposes
C,D: alloys according to the invention

What is claimed is:

1. Aluminum alloy cathode foils for electrolytic capacitors, said alloy consisting essentially of
   0.9 to 1.7% iron
   0.1 to 0.8% manganese
   max. 0.15% silicon
   max. 0.3% copper,
the remainder being aluminum with further trace elements individually <0.05%, in total <0.15%, and the total iron and manganese content amounting at most to 1.9%, said alloy having good capacitance values after etching.

2. Aluminum alloy according to claim 1 wherein the said alloy contains 1.0 to 1.5% iron.

3. Aluminum alloy according to claim 1 wherein the said alloy contains 0.1 to 0.5% manganese.

4. Aluminum alloy according to claim 1 wherein the said alloy contains at most 0.1% copper.

5. Aluminum alloy according to claim 4 wherein the said alloy contains at most 0.05% copper.

6. Aluminum alloy according to claim 1 wherein the said alloy contains 0.1 to 0.3% copper.

7. Aluminum alloy according to claim 1 in the form of thin strip.

* * * * *

UNITED STATES PATENT AND TRADEMARK OFFICE
CERTIFICATE OF CORRECTION

PATENT NO. : 5,030,416
DATED : July 9, 1991
INVENTOR(S) : MARTIN WERNER ET AL.

It is certified that error appears in the above-identified patent and that said Letters Patent is hereby corrected as shown below:

TITLE PAGE: Item [45] the issued date should read --July 9, 1991--.

In Column 2, line 10, "this" should read --thin--.

Signed and Sealed this

Thirteenth Day of October, 1992

Attest:

DOUGLAS B. COMER

*Attesting Officer*      Acting Commissioner of Patents and Trademarks